(12) United States Patent
Hirose

(10) Patent No.: US 11,111,940 B2
(45) Date of Patent: Sep. 7, 2021

(54) LEG COUPLING FOR TABLE

(71) Applicant: EVIS FURNITURE CO., LTD., Saitama (JP)

(72) Inventor: Yusuke Hirose, Saitama (JP)

(73) Assignee: EVIS FURNITURE CO., LTD., Saitama (JP)

( * ) Notice: Subject to any disclaimer, the term of this patent is extended or adjusted under 35 U.S.C. 154(b) by 17 days.

(21) Appl. No.: 16/594,563

(22) Filed: Oct. 7, 2019

(65) Prior Publication Data
US 2020/0116183 A1  Apr. 16, 2020

(30) Foreign Application Priority Data
Oct. 16, 2018  (JP) ............................. JP2018-194987

(51) Int. Cl.
*F16B 12/44* (2006.01)
*F16B 12/10* (2006.01)

(52) U.S. Cl.
CPC .............. *F16B 12/44* (2013.01); *F16B 12/10* (2013.01); *F16B 2012/106* (2013.01); *F16B 2012/446* (2013.01)

(58) Field of Classification Search
CPC .... F16B 12/44; F16B 12/10; F16B 2012/106; F16B 2012/446; F16B 12/14; F16B 2012/145; F16B 12/20; F16B 2012/2081; F16B 12/2063; F16B 12/30; F16B 12/32; F16B 12/2036; F16B 12/2054; F16B 39/023; F16B 2200/406; F16B 7/044; F16B 7/025; A47B 2013/022; A47B 13/02; A47B 13/021; A47B 13/003; A47B 2013/006
See application file for complete search history.

(56) References Cited

U.S. PATENT DOCUMENTS

| | | | | | |
|---|---|---|---|---|---|
| H906 H | * | 4/1991 | Baggett | .......................... | 254/104 |
| 5,116,160 A | * | 5/1992 | Pold | ........................ | F16B 12/52 403/172 |
| 5,197,349 A | * | 3/1993 | Herman | ................. | B62K 21/18 280/278 |
| 5,232,304 A | * | 8/1993 | Huang | .................... | F16B 7/025 403/374.4 |

(Continued)

FOREIGN PATENT DOCUMENTS

| | | |
|---|---|---|
| JP | 49-3802 | 1/1974 |
| JP | 2679649 | 11/1997 |

*Primary Examiner* — Christopher Garft
(74) *Attorney, Agent, or Firm* — Wenderoth, Lind & Ponack, L.L.P.

(57) ABSTRACT

A leg coupling for a table includes a coupling body for supporting a lower surface of a top plate. The coupling body includes an upper coupling projecting downward. The upper coupling is configured to be inserted into a coupling insertion hole of a leg. A lower coupling with a thread hole is coaxially arranged under the upper coupling. The coupling body includes a bolt insertion hole. A bolt inserted into the bolt insertion hole is screwed into the thread hole of the lower coupling. A peripheral surface of the upper coupling or a peripheral surface of the lower coupling can be pressfitted to an inner surface of the leg. The peripheral surface of the upper coupling has the same diameter as the peripheral surface of the lower coupling. Opposing ends of the upper coupling and the lower coupling have taper surfaces that can be engaged with each other.

10 Claims, 17 Drawing Sheets

(56) References Cited

U.S. PATENT DOCUMENTS

| | | | | |
|---|---|---|---|---|
| 5,333,888 A * | 8/1994 | Ball | ............ | B60D 1/52 |
| | | | | 280/504 |
| 5,423,566 A * | 6/1995 | Warrington | ............ | B60D 1/52 |
| | | | | 224/521 |
| 5,915,900 A * | 6/1999 | Boltz | ............ | B60P 7/0807 |
| | | | | 410/110 |
| 7,703,727 B2 * | 4/2010 | Selness | ............ | A47B 91/028 |
| | | | | 248/188.2 |
| 7,802,768 B2 * | 9/2010 | Carnevali | ............ | F16B 7/14 |
| | | | | 248/412 |
| 8,020,828 B2 * | 9/2011 | Carnevali | ............ | F16M 11/28 |
| | | | | 248/412 |
| 8,827,220 B2 * | 9/2014 | Eriksen | ............ | A47B 9/083 |
| | | | | 248/188 |
| 2005/0042024 A1 * | 2/2005 | Patrignani | ............ | F16B 7/025 |
| | | | | 403/297 |
| 2006/0081283 A1 * | 4/2006 | Ma | ............ | E04H 15/44 |
| | | | | 135/121 |
| 2009/0218789 A1 * | 9/2009 | Beck | ............ | B60D 1/52 |
| | | | | 280/511 |
| 2015/0008204 A1 * | 1/2015 | Choy | ............ | F16B 7/185 |
| | | | | 211/186 |
| 2017/0292549 A1 * | 10/2017 | Del Missier | ............ | F16B 7/20 |
| 2019/0120268 A1 * | 4/2019 | Hill | ............ | F16B 7/0413 |

* cited by examiner

Fig. 21(a)
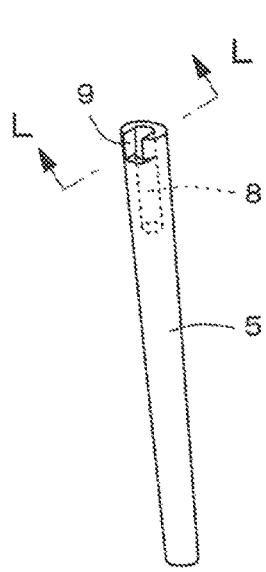
Fig. 21(b)
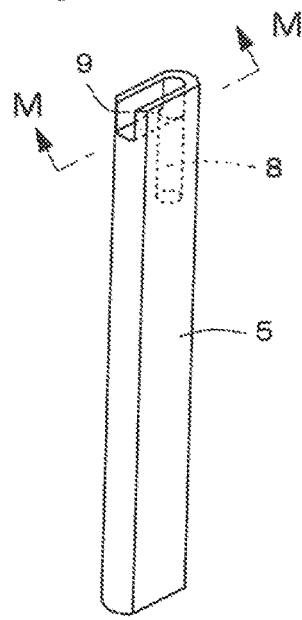
Fig. 21(c)
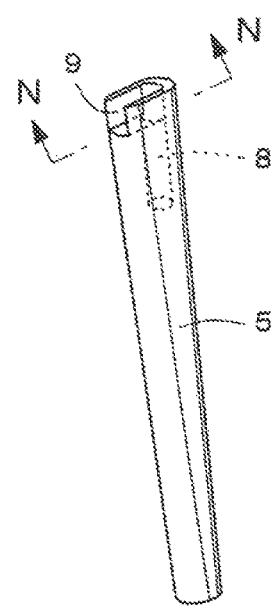
Fig. 21(f)
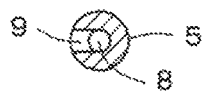
Fig. 21(g)
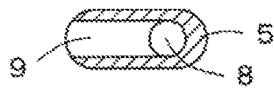
Fig. 21(h)
Fig. 21(d)
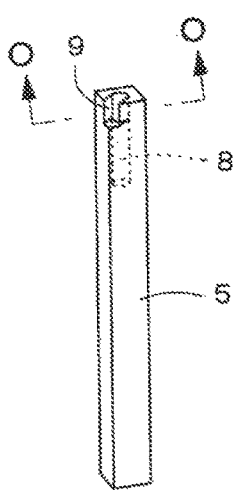
Fig. 21(e)
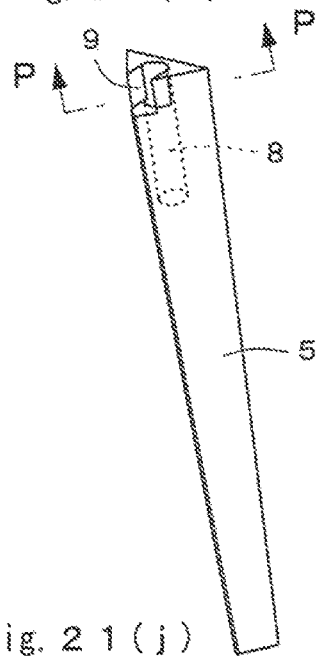
Fig. 21(i)
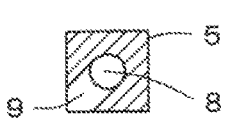
Fig. 21(j)
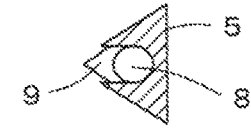

LEG COUPLING FOR TABLE

TECHNICAL FIELD

This invention relates to a leg coupling for a table, etc., which is suitable for attaching, for example, to a table leg made of solid wood, and which is simple in structure and can be made easily and inexpensively, and which can be easily and firmly attached to a table leg having a wide variety of shapes and/or sectional shapes.

BACKGROUND ART

Conventionally, as means for connecting a leg to the lower surface of a top plate of a table, there is known a technology in which a concave engagement hole is formed in each corner part of the top plate, a leg attachment plate is tightly screwed into the concave engagement hole, a leg joint part is fitted to the leg attachment plate, the leg joint part is fitted to the leg attachment plate, the leg joint part is locked to a leg lock bracket, and a leg pipe is fitted into a space between a peripheral surface of the leg joint part and the leg lock bracket (see, for example, Japanese Patent No. 2679649).

However, the above-mentioned leg connection mechanism has such an inconvenience that the leg attachment plate, leg joint part and leg lock bracket are required, and since shapes and dimensions thereof are formed depending on the inner or outer diameters of the leg pipe, difficulties occur when the inner and outer diameters of the leg are changed.

Also, there is another related prior art of the table leg connection means, in which an attachment bracket is screwed to a lower surface of a table, a bolt is inserted into its side hole, its thread shaft is tightly screwed into a hole formed in a support arm for the table, a slit is formed in a lower part of a coupling body, a conical wedge is inserted into the slit, the wedge is screwed to a bolt inserted in an upper part of the coupling body so as to expand the slit, the opened slit is press fitted to an inner surface of a leg tube which is fitted to the lower part of the coupling body, so that the coupling body and the leg tube can be connected to each other (see, for example, Japanese Utility Model Application Publication No. S49-3802).

However, the above-mentioned connection means has such drawbacks that many parts such as an attachment bracket, a conical wedge, and the like, and thus, the structure is complicate, connection of those parts require much time and effort. In addition, when the inner diameter is changed, it became difficult to meet with the changed situation or requirements. So, it became necessary to remake the component parts so as to have new shapes and dimensions.

SUMMARY OF THE PROBLEM

It is, therefore, an object of the present invention to provide, in order to solve the above-mentioned problems, a leg coupling for a table, etc., which is suitable for attaching a table leg made, for example, of solid wood, and which is simple in structure and can be made easily and inexpensively, and which can be attached to a table leg having a wide variety of shapes and/or sectional shapes easily and firmly.

According to one aspect of the present invention, in a leg coupling for a table, etc., in which a coupling body supporting a lower surface of a top plate is provided with an upper coupling projecting downward, the upper coupling is inserted into a coupling body insertion hole of a leg, a lower coupling formed with a thread hole is coaxially arranged under the upper coupling, the coupling body is formed with a bolt insertion hole, a bolt inserted into the bolt insertion hole is screwed into the thread hole of the lower coupling, a peripheral surface of either the upper or lower coupling can be press-fitted to an inner surface of the leg, a leg coupling for a table, etc. (the improvement) is characterized in that the outer peripheral surface of the upper coupling has the same diameter as that of the outer peripheral surface of the lower coupling, the outer peripheral surfaces of the upper and lower couplings are arranged in such a manner as to be able to engage an inner surface of the coupling insertion hole, the upper and lower couplings are formed on opposing ends thereof with taper surfaces that can be engaged with each other, and the taper surfaces are formed with a convex part and a concave groove in such a manner as to be engageable and slidable with each other. Owing to the foregoing arrangement, the leg is supported by the upper and lower couplings firmly, the convex part and concave groove are engageably and slidably formed so as to restrict the operation of the taper surface and the lower coupling, press-fit the lower coupling to the inner surface of the insertion hole reliably, and retain the leg firmly by the press-fitting force.

In the leg coupling for a table, etc., the upper and lower couplings are formed in an obliquely cut columnar shape. Owing to the foregoing arrangement, they can be press-fitted through the taper surfaces thereof, and the lower coupling can be displaced along the taper surfaces.

In the leg coupling for a table, etc., a taper surface of a lower end of the upper coupling is formed with a convex part, and a taper surface of an upper end of the lower coupling is formed with a concave groove. Owing to the foregoing arrangement, load and pressing force exerted from the upper coupling is dispersed to the two taper surfaces of the lower coupling so that those contact surface forces are reduced, thereby enhancing the smooth displacement of the lower coupling.

In the leg coupling for a table, etc., when the bolt is tightened, the lower coupling can be moved upward along the convex part, and one side peripheral surface of the lower coupling can be displaced in such a manner as to project outward from the peripheral surface of the upper coupling. Owing to the foregoing arrangement, the lower coupling is caused to move upward along the convex part reliably by the tension generated when the bolt is tightened.

In the leg coupling for a table, etc., when the lower coupling is moved upward, one side surface thereof can be press fitted to an inner surface of the coupling insertion hole. Owing to the foregoing arrangement, the press-fitting to the inner surface of the coupling insertion hole is realized by the amount of projecting displacement toward outside of the lower coupling, and the leg is retained firmly by the contacting surface pressure.

In the leg coupling for a table, etc., when the lower coupling is moved upward, the bolt can be displaced in the same direction as the press-fitting direction of the lower coupling. Owing to the foregoing arrangement, the bolt is press-fitted to the inner surface of the bolt insertion hole, the lower coupling is retained, the press-fitting with respect to the inner surface of the bolt insertion hole is enhanced, and the press-fitting with respect to the inner surface of the coupling insertion hole is strengthened by the one side peripheral surface of the upper and lower couplings, so that the leg is retained firmly.

In the leg coupling for a table, etc., the bolt can be press fitted to the inner surface of the bolt insertion hole. Owing to the foregoing arrangement, the retaining of the lower coupling is enhanced by the press-fitting force.

In the leg coupling for a table, etc., the leg is formed at an upper part thereof with a coupling insertion hole having a bottom into which the upper and lower couplings can be inserted. Owing to the foregoing arrangement, it can be readily used regardless of the outer diameter and outer peripheral surface of the leg, and can cope with various designs, decorations and forms of the leg. This effect is particularly suitably used for a wooden leg for the furniture or table to which various designs and decorations are applied.

In the leg coupling for a table, etc., the coupling body is formed at one end thereof with a square frustum shaped engagement hole, and a pair of wedge shaped connection elements is press inserted into the engagement hole for connection. Owing to the foregoing arrangement, a pair of connection elements are press-fitted to one end of the coupling body, so that it can cope with easy assembly of the component members associated with the connection elements.

In the leg coupling for a table, etc., the connection element is provided at the other end thereof with a joint to which a lower frame can be attached. Owing to the foregoing arrangement, by integrally forming the joint on the connecting elements, for example, the lower frame is attached to the joint so that the lower surface of the top plate can be supported reasonably and stably.

BRIEF DESCRIPTION OF DRAWINGS

FIGS. 21(*a*) through (*e*) are perspective views, showing various forms of a leg to which the present invention can be applied, in which FIG. 21(*f*) is an enlarged sectional view taken on line L-L of FIG. 21(*a*), FIG. 21(*g*) is an enlarged sectional view taken on line M-M of FIG. 21(*b*), FIG. 21(*h*) is an enlarged sectional view taken on line N-N of FIG. 21(*c*), FIG. 21(*i*) is an enlarged sectional view taken on line O-O of FIG. 21(*d*), and FIG. 21(*j*) is an enlarged sectional view taken on line P-P of FIG. 21(*e*).

EMBODIMENTS OF THE INVENTION

Figure 1:
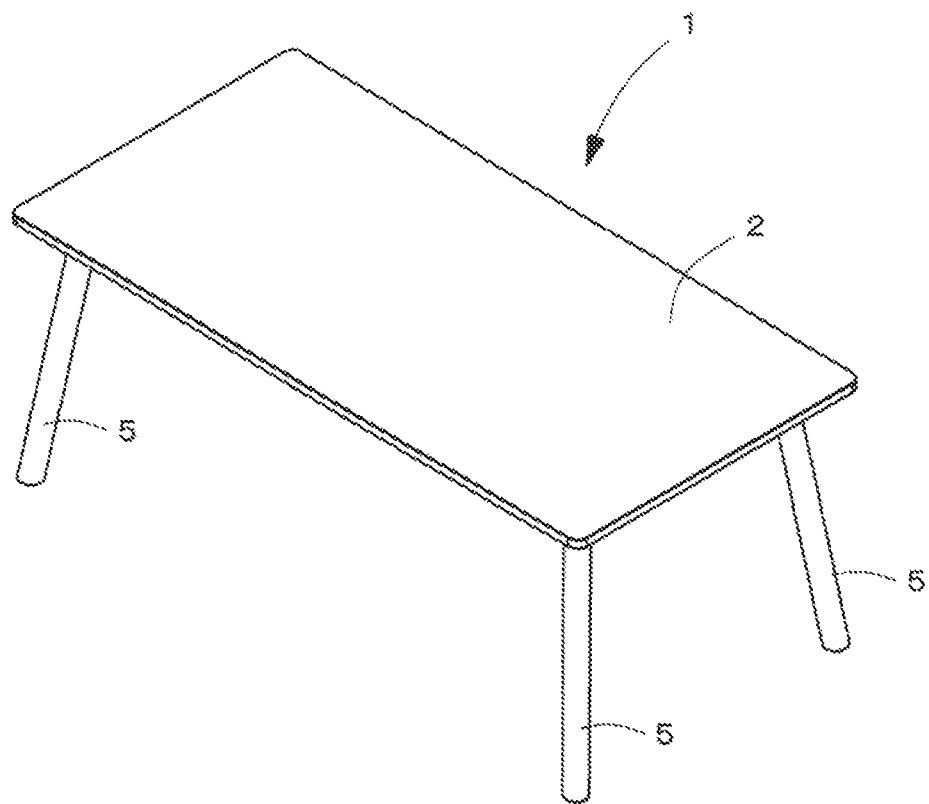
FIG. 1 is a perspective view showing a meeting table to which the present invention is applied.
Figure 2:
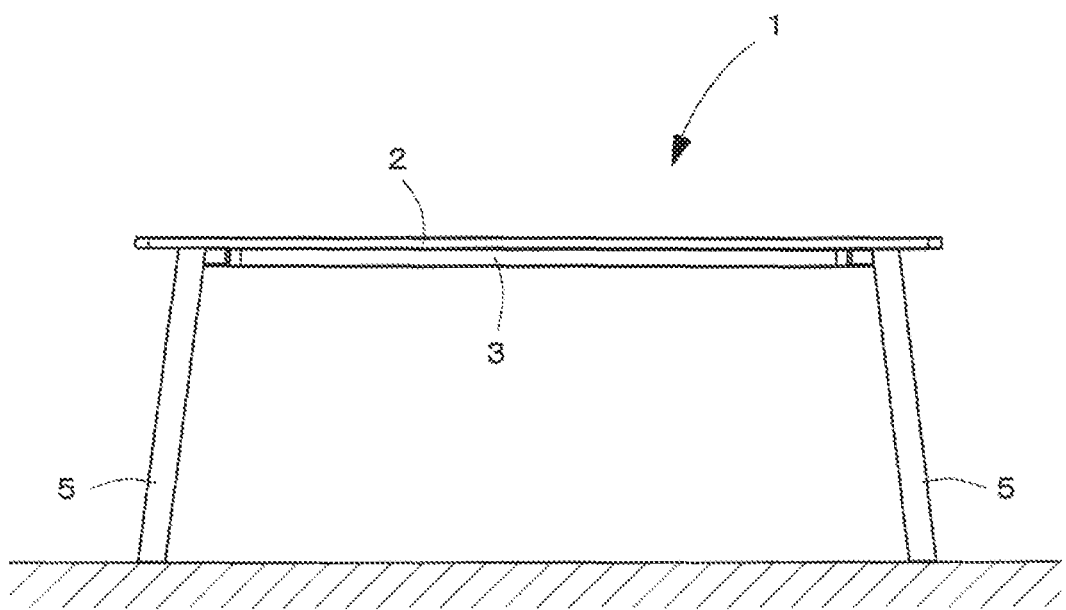
FIG. 2 is a front view of the above meeting table.
Figure 3:
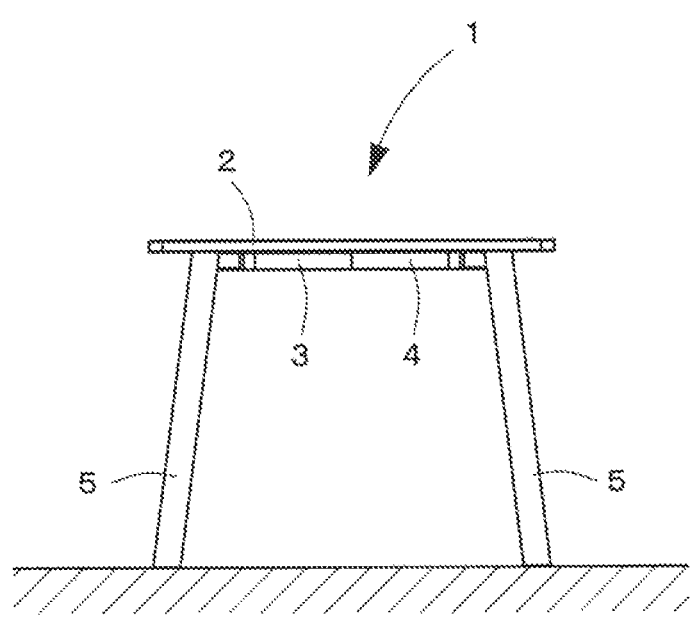
FIG. 3 is a side view of FIG. 2.
Figure 4:
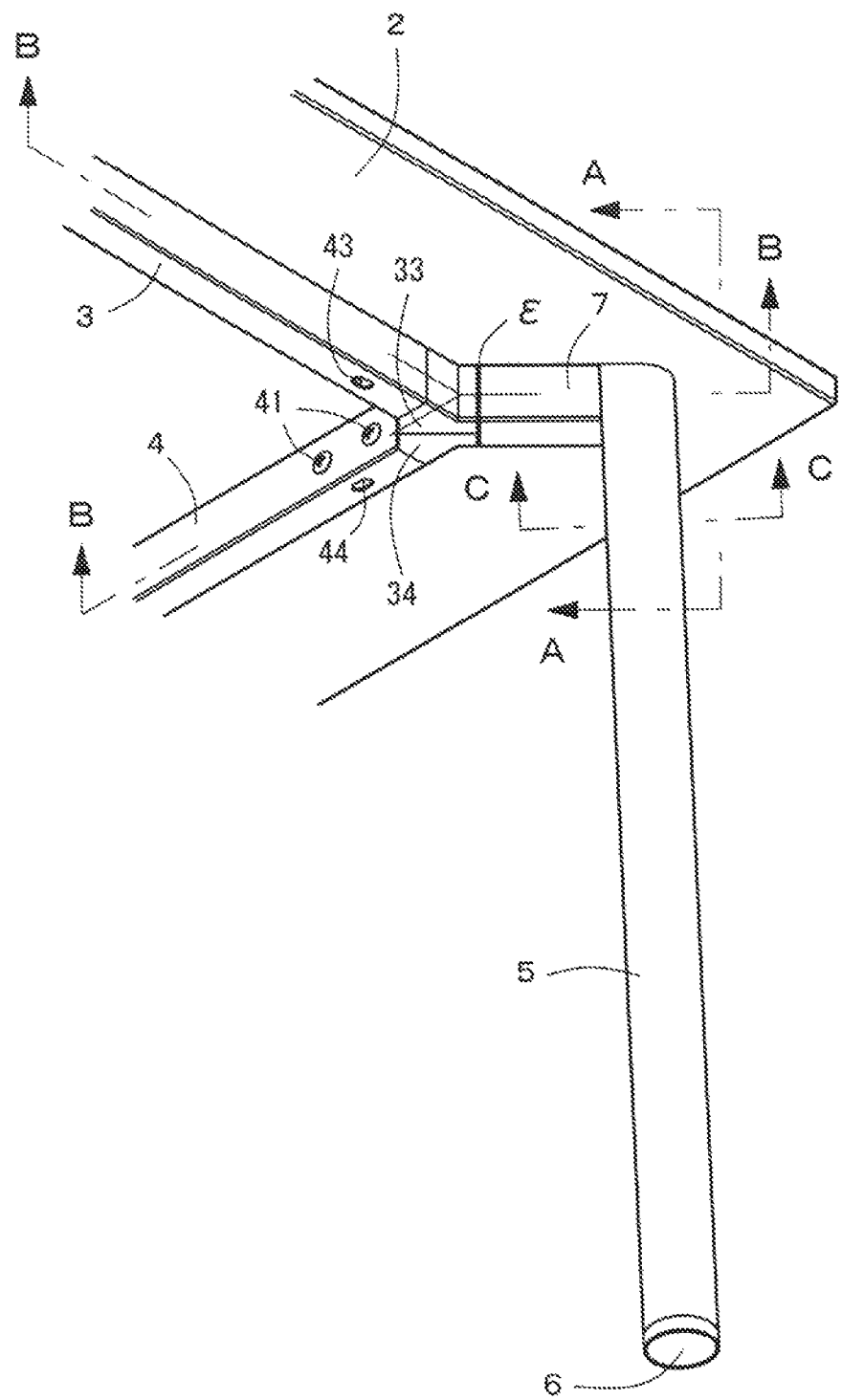
FIG. 4 is a perspective view showing an important part of the meeting table to which the present invention is applied, showing an attaching status of a lower surface of a top plate, a coupling body and a leg.

One embodiment of the present invention will now be described hereinafter with reference to the drawing, in which the present invention is applied to a meeting table. In FIGS. 1 through 21, reference numeral 1 denotes a meeting table, a top plate 2 of which has a laterally elongated rectangular shape and is provided at an outer side part of a lower surface thereof with rectangular tubular lower frames 3,4 which are orthogonal to each other. The top plate 2 is attached to an angular part of the lower surface with an upper end of a leg 5 which extends slantwise downward with a lower end thereof placed slightly outward.

The leg 5 is configured in a cylindrical shape made of wood such that it has the same diameter in the longitudinal direction. The leg 5 is attached at a lower end thereof with a cap 6 which is made of tubular and integrally attached at an upper end thereof with a generally L-shaped coupling body 7 which is made by aluminum diecasting.

The leg 5 is formed in a solid shape, i.e., in a solid cylindrical shape. The leg 5 is formed at an upper end thereof with a bottomed coupling insertion hole which has a circular shape in section. The insertion hole 8 is formed at an upper end thereof with a notch groove 9 which is notched sideward. The coupling body 7 is intimately attached to the insertion hole 8 through the notch groove 9.

A lower coupling 10 and an upper coupling 11, which are made by aluminum diecasting, are inserted in the coupling insertion hole 8 such that the upper and lower couplings 10, 11 can be vertically engaged with each other.

Of those component elements, the lower coupling 10 is formed in an obliquely cut columnar shape and a thread hole 12 is formed through therein. A lower coupling 10 has a taper surface 13 at the obliquely cut part of an upper end thereof, and a concave groove 14 is formed, in a taper shape, on the taper surface 13. The thread hole 12 is open in the concave groove 14.

Likewise, the upper coupling 11 is formed in an obliquely cut columnar shape. The upper coupling 11 has a taper surface 15 at the obliquely cut part of a lower end thereof, and a convex part 16 is formed, in a taper shape, on the taper surface 15 such that convex part 16 can slide and couple with the concave groove 14. The convex part 16 is formed with an oval-shaped bolt insertion hole 17.

The bolt insertion hole 17 is open in an elongated hole-shaped stepped hole 18 formed at a flat upper end face of the coupling body 7. Before the attachment of the top plate 2, a bolt 19 is inserted into the stepped hole 18 through a washer 20, so that a thread shaft thereof can be screwed into the thread hole 12. In the figures, reference numeral 19 denotes a coupling groove for a wrench (not shown) formed on a head part of the bolt 19.

The lower coupling 10 is arranged in the coupling insertion hole 8 with the taper surface 13 facing upward, while the upper coupling 11 is arranged with the taper surface 15 facing downward. The convex part 14 is slidably connected to the concave groove 14, and as shown in FIGS. 17(*a*) and 17(*c*), before the bolt 19 is tightened, an outer peripheral surface of the lower coupling 10 is concentrically arranged in the coupling insertion hole 8, and a minute gap is formed therebetween.

Figure 17:
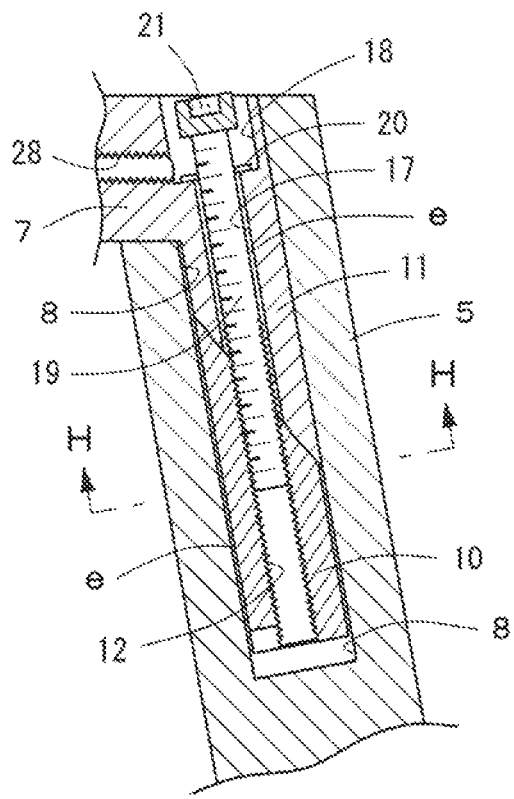
FIG. 17 (*a*) is a sectional view showing a status of the upper and lower couplings, which are applied to the present invention, before the bolt is tightened, FIG. 17(*b*) is a sectional view showing a status of the upper and lower couplings, which are applied to the present invention, after the bolt is tightened, FIG. 17(*c*) is a sectional view taken on line H-H of the just mentioned FIG. 17(*a*), and FIG. 17(*d*) is a sectional view taken on line I-I of the just mentioned FIG. 17(*b*).
Figure 17:
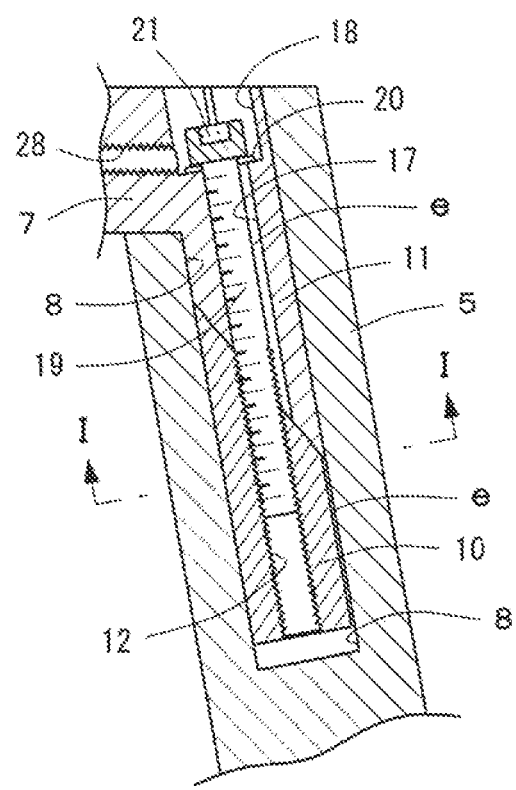
Figure 17:
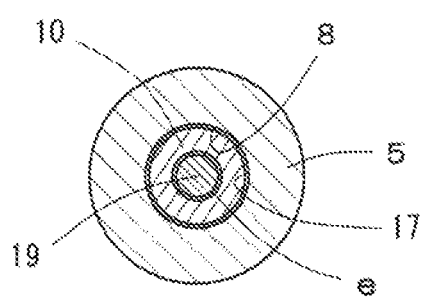
Figure 17:
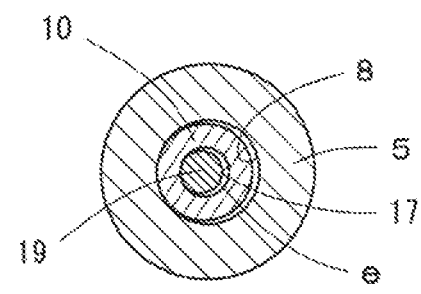
Figure 18:
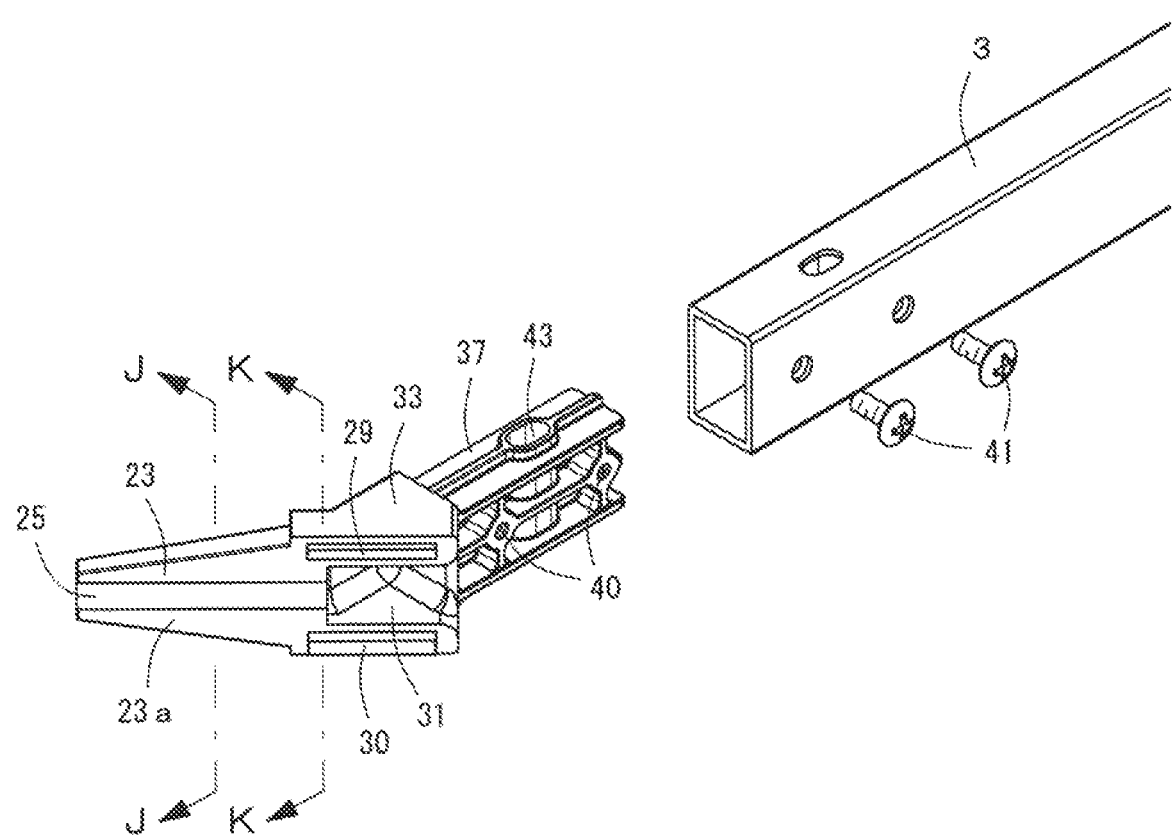
FIG. 18 is a perspective view showing, in an exploded state, one connection element and a lower frame which are applied to the present invention.
Figure 19:
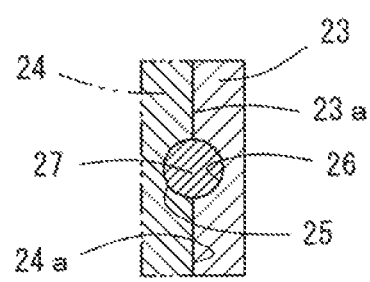
FIG. 19 is a sectional view taken on line J-J of FIG. 18.
Figure 20:
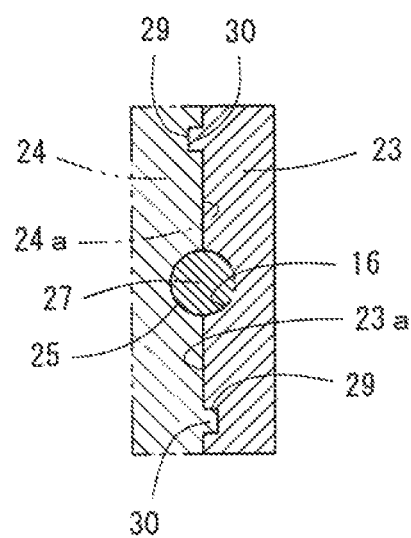
FIG. 20 is a sectional view taken on line K-K of FIG. 18.

After the bolt 19 is tightened, as shown in FIGS. 17(*b*) and 17(*d*), the lower coupling 10 is pulled upward by tensile force of the bolt 19, the tapered concave groove 14 is moved upward along the convex part 16, the outer peripheral surface thereof is minutely displaced and projected sideward, thus enabling to press contact the inner surface of the coupling insertion hole 8 by the amount of the displacement.

Then, in accordance with the displacement of the lower coupling 10, the bolt 19 is moved together and press-fitted to the inner peripheral surface of the bolt insertion hole 17 so as to move the outer peripheral surface of the upper coupling 11 together by small amount, so that the outer peripheral surface can be press-fitted to the peripheral surface of the coupling insertion hole 8.

Accordingly, the gap e between the press-fitting side of the bolt insertion hole 17 and the bolt 19 is lost but the gap e between the press-fitting side and the other side of the bolt insertion hole 17 and the bolt 19 is approximately doubled.

By tightening the bolt 19 in this way, the outer peripheral surface of the lower coupling 10 and the outer peripheral surface of the upper coupling 11 on the same side are press-fitting to the inner surface of the coupling insertion hole 8, and by this press-fitting force, the leg 5 is firmly retained.

In this case, the concave groove 14 of the lower coupling 10 and the convex part 16 of the upper coupling 11 are engaged with each other so as to restrict the direction of movement, thereby restricting the upward movement of the lower coupling 10 in accordance with the progress of the tightening movement of the bolt 19.

Further, by forming the gap e between the bolt insertion hole 17 and the bolt 19, the movement of the bolt 19 is allowed in the bolt insertion hole 17 when the bolt 17 is tightened.

The upper part of the coupling body 7 is formed in a rectangular tubular shape and an engagement hole 22 is open in a side end part thereof. A pair of connection elements, as later described, is inserted into the engagement hole 22, so that one end thereof can be connected to the lower frames 3, 4.

The interior of the engagement hole 22 is formed in an empty space having a truncated pyramid shape, an inner surface thereof is formed with a taper surface converging inward, and the interior thereof is divided into upper and lower surfaces 22*a*, 22*b* and right and left surfaces 22*c*, 33*d*.

In this embodiment, the taper angle θa of the upper and lower surfaces 22*a*, 22*b* is formed larger than the taper angle θb of the right and left surfaces 22*c*, 22*d* (θa>θb). Specifically, θa is approximately 18° and θb is approximately 6°.

In this case, it is also acceptable that the taper angle θa and the taper angle θb are made equal, or one of the taper angles θa and θb are made zero so as to form a flat surface.

Figure 5:
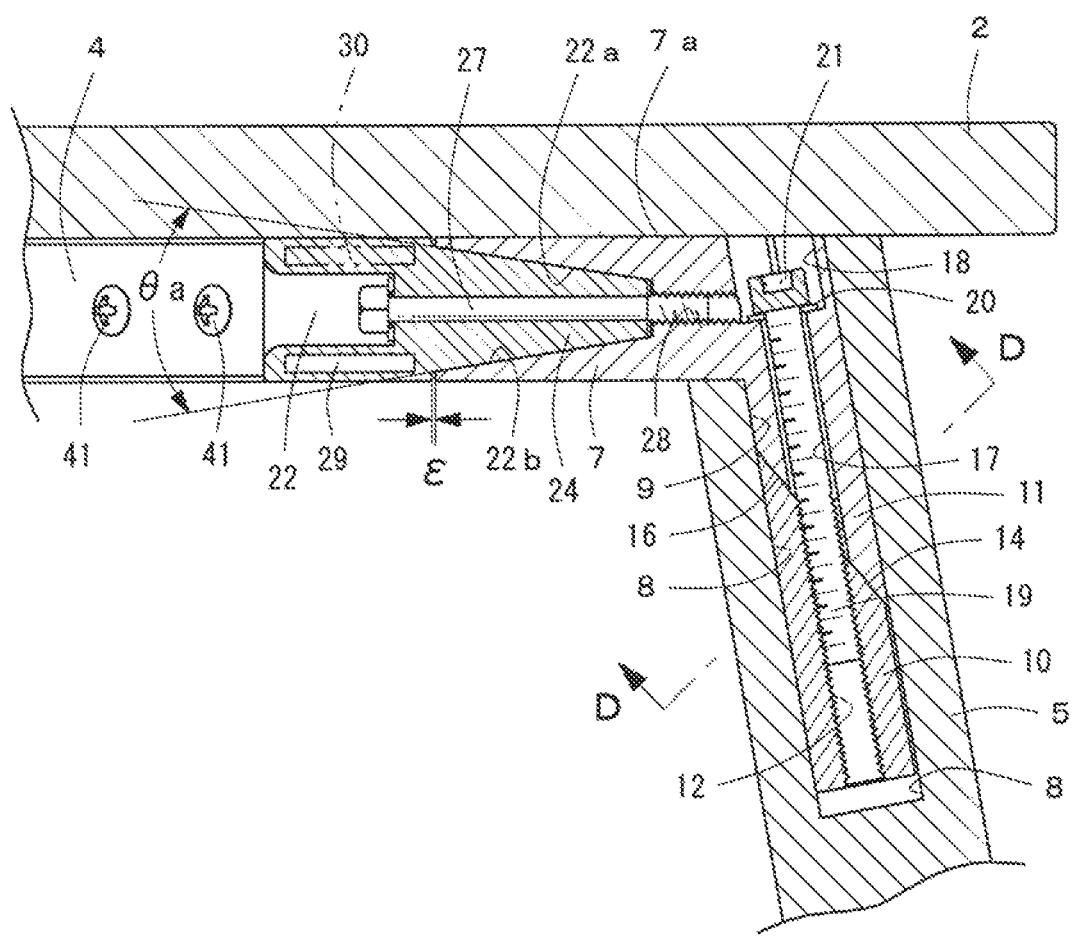
FIG. 5 is a sectional view taken on line A-A of FIG. 4.

A pair of connection elements 23, 24, which is made by aluminum diecasting, is press fitted into the engagement hole 22. The pair of connection elements 23, 24 is formed in a wedge shaped plate, and the side shape thereof is, as shown in FIG. 5, formed in an isosceles trapezoidal shape. The upper and lower surfaces of the connection elements 23, 24 are formed in a taper surface so that the upper and lower surfaces can be engaged with the upper and lower surfaces 22*a*, 22*b* of the engagement hole 22.

Figure 6:
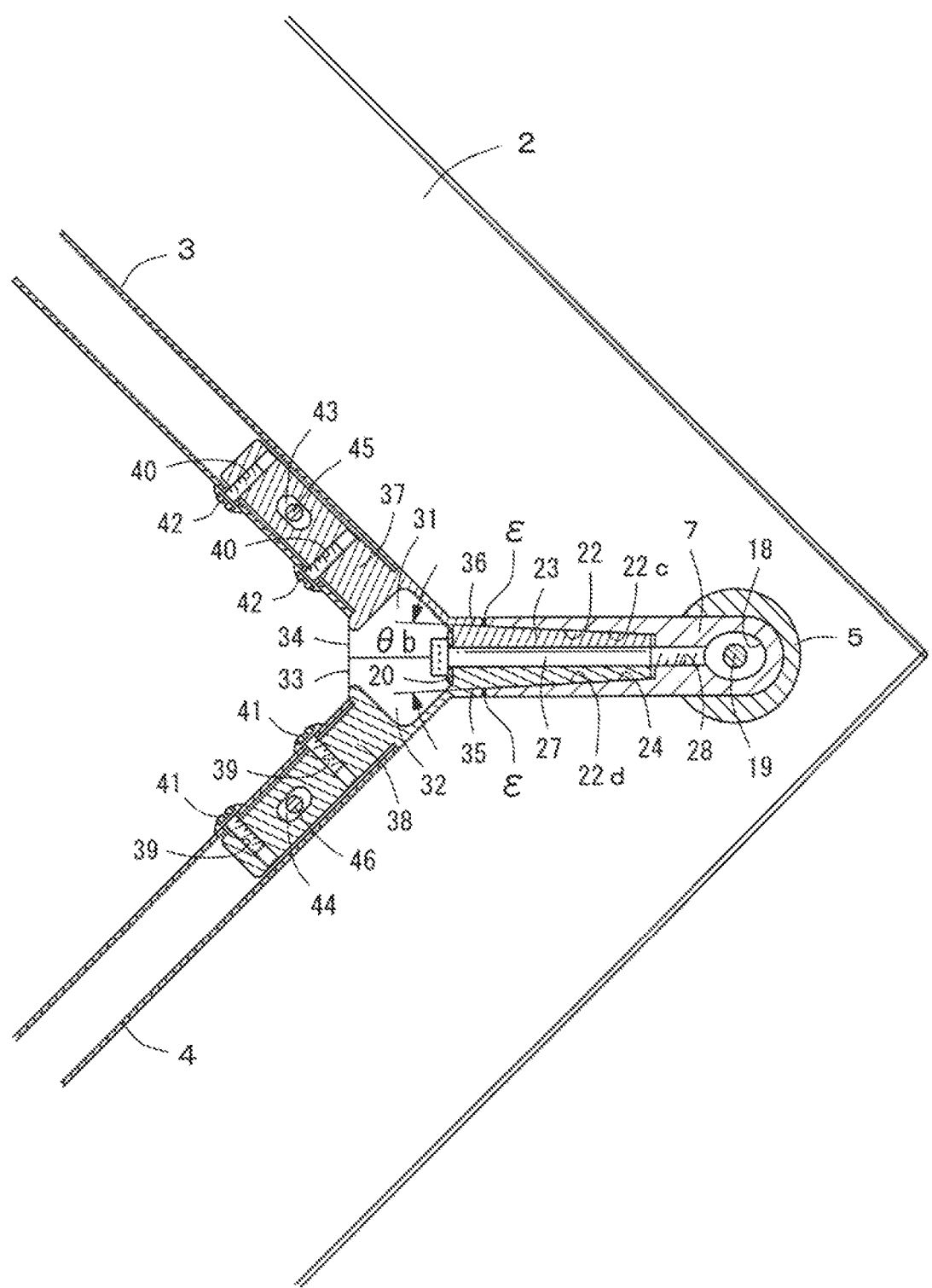
FIG. 6 is a sectional view taken on line B-B of FIG. 4.
Figure 7:
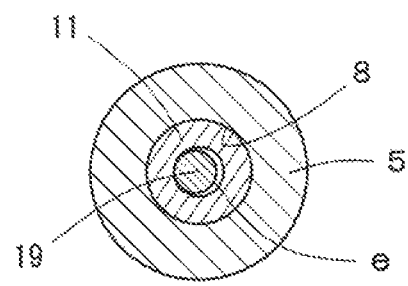
FIG. 7 is a sectional view taken on line C-C of FIG. 4.
Figure 8:
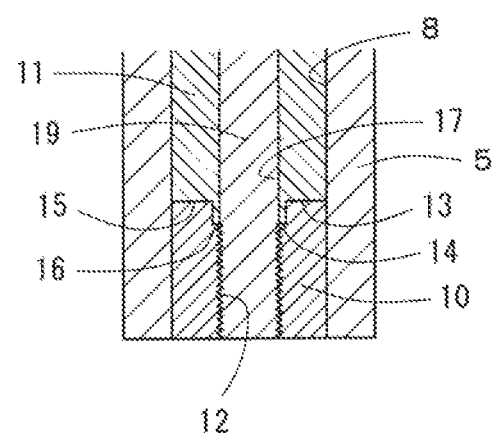
FIG. 8 is a sectional view taken on line D-D of FIG. 5.
Figure 9:
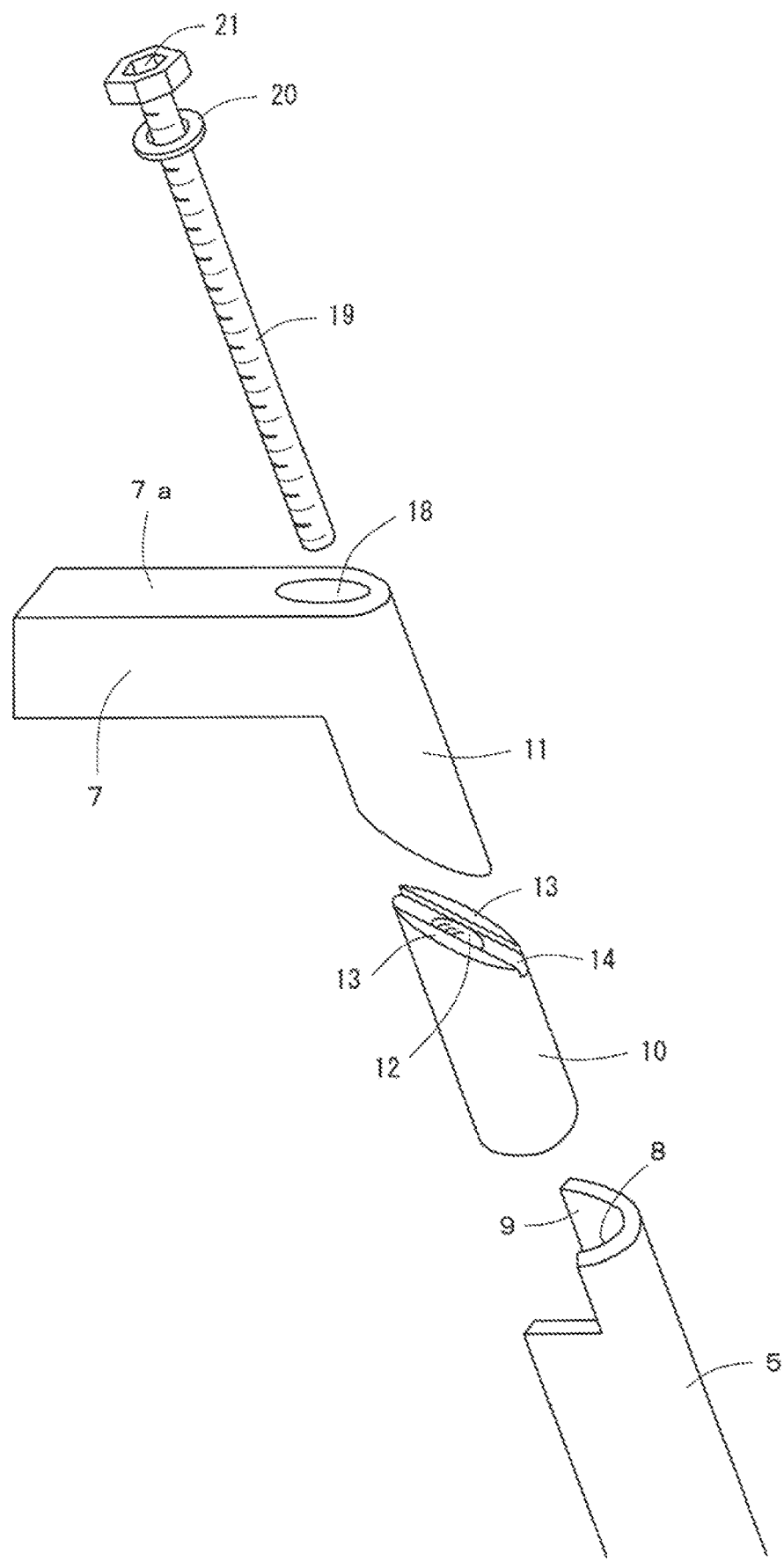
FIG. 9 is an exploded perspective view showing an important part of the present invention, showing a coupling body including an upper coupling; a lower coupling and a bolt.
Figure 10:
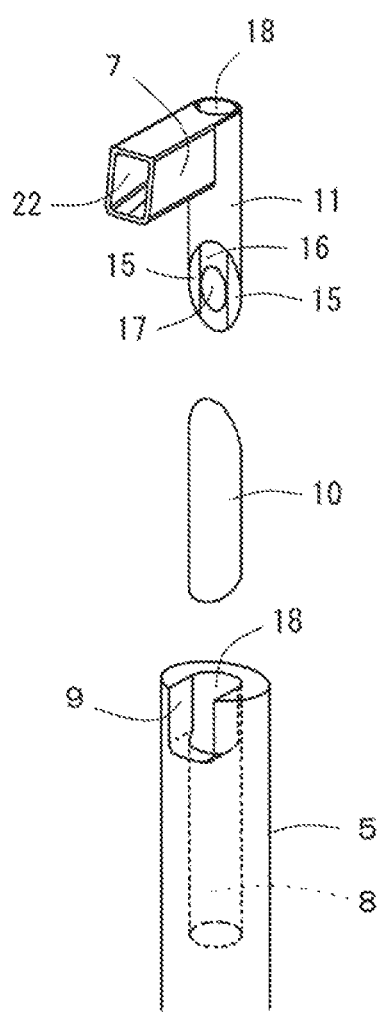
FIG. 10 is an exploded perspective view showing an important part of the present invention, showing a coupling body, a lower coupling and an upper part of the leg.
Figure 11:
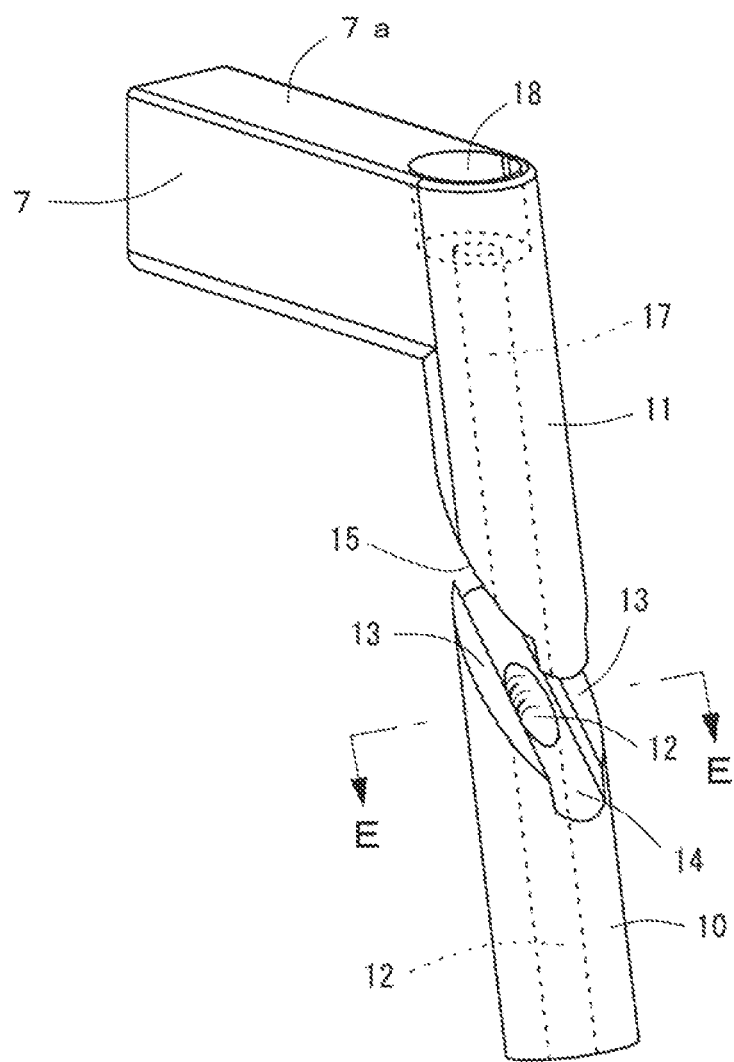
FIG. 11 is an exploded perspective view showing a coupling body including an upper coupling, and a lower coupling, which are applied to the present invention.
Figure 12:
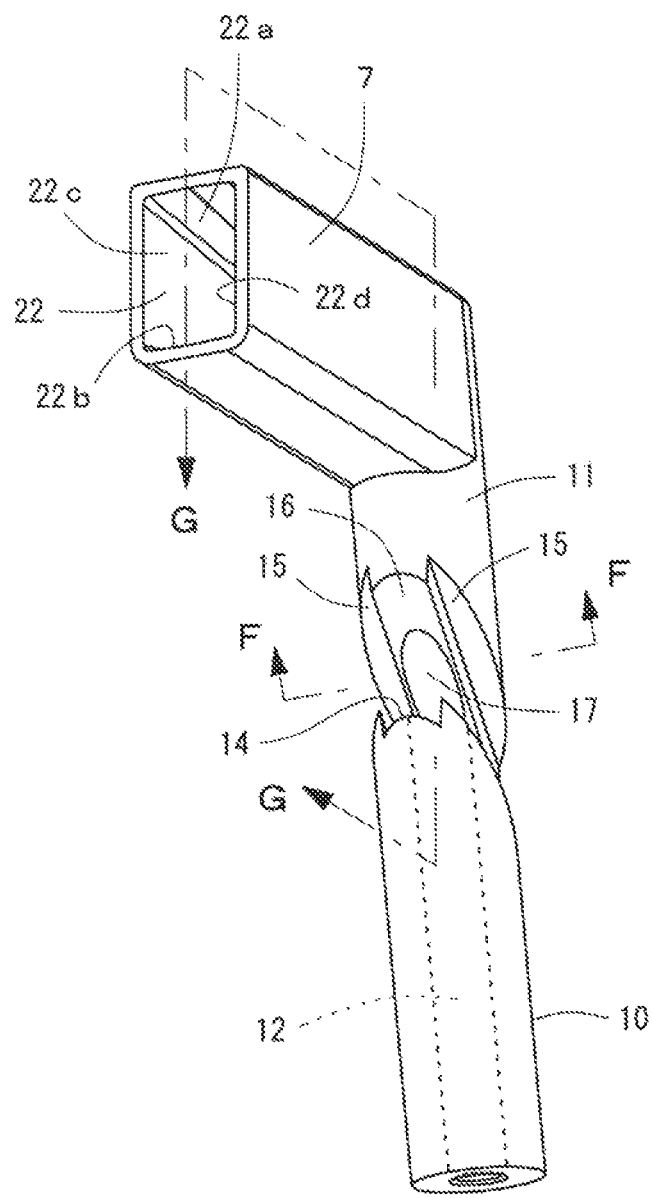
FIG. 12 is an exploded perspective view, when viewed from the side, of FIG. 11.
Figure 13:
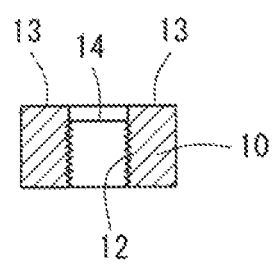
FIG. 13 is a sectional view taken on line E-E of FIG. 11.
Figure 14:
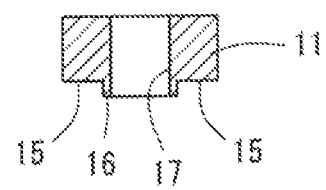
FIG. 14 is a sectional view taken on line F-F of FIG. 12.
Figure 15:
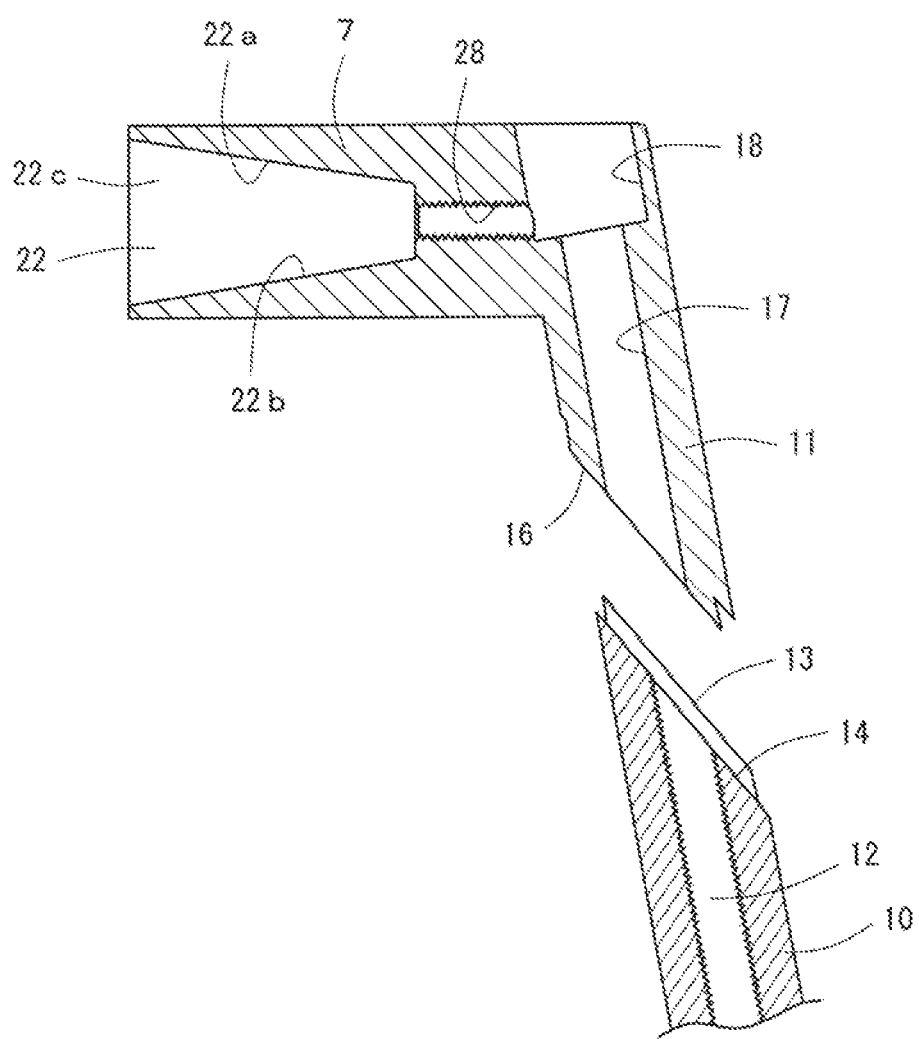
FIG. 15 is a sectional view taken on line G-G of FIG. 12.
Figure 16:
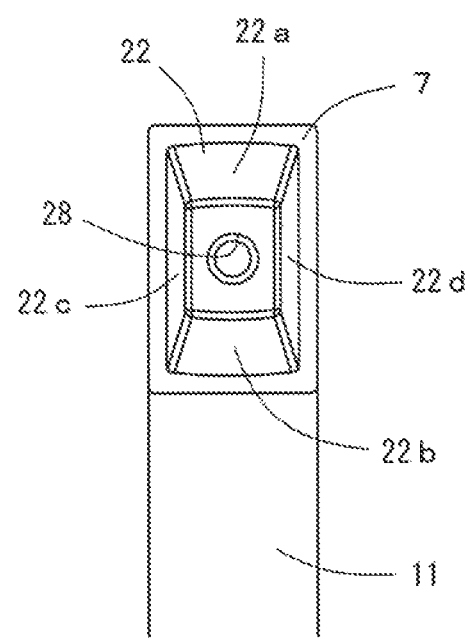
FIG. 16 is a front view showing a side end part of a coupling body which is applied to the present invention, showing in a slightly enlarged scale.

Likewise, the cross-sectional shape of the connection elements 23, 24 is formed in an elongated trapezoidal shape as shown in FIG. 6, and an outer side surface thereof is formed in a taper surface engageable to the left and right surfaces 22*c*, 22*d* of the engagement hole 22.

Opposing joint parts 23*a*, 34*a* of the connection elements 23, 24 are formed in a flat surface. The joint surfaces 23*a*, 24*a* are formed at one end thereof with concave grooves 25, 26 each having a semi-circular shape in section. A bolt 27 is inserted into a circular through-hole, which is formed by joining the concave grooves 25, 26, from the opening side of the engagement hole 22, and a thread shaft thereof is screwed into a thread hole 28 which is open in a bottom part of the engagement hole 22, so that the connection elements 23, 24 are intimately attached so as to be fixed to the coupling body 7.

The joint part 23*a* is provided at a basal part side thereof is provided with a laterally elongated convex-shaped guide 29 and a laterally elongated guide groove 30, and the opposing other connection element 24 is likewise formed at a basal part of the joint surface 24*a* with a laterally elongated convex-shaped guide and a laterally elongated guide groove with vertical positions thereof reversed, so that when the connection elements 23, 24 are assembled, they are connected and intimately jointed with each other.

In those Figs., reference numerals 31, 32 denote wide and deep notch grooves formed between the convex guide 29 and the guide groove 30. The notch grooves 31, 32 are formed such that when assembled, they can communicate with each other and the bolt 27 can be screwed into the thread hole 28 with a finger inserted into these notch grooves 31, 32.

The notch grooves 31. 32 are integrally formed at upper sides thereof with deformed joint elements 33, 34 and at one end thereof with projecting convex parts 35, 36. A small assembling margin E is provided between the convex parts 35, 36 and an opening edge of the engagement hole 22, thus enabling for the connection elements 23, 24 to perform engagement and adjustment.

The joint elements 33, 34 are provided at tip parts thereof with columnar joints 37, 38 in such a manner as to project therefrom and to allow the lower frames 3, 4 to be inserted therein. The joints 37, 38 together with the connection elements 23, 24 are formed in a generally dogleg shape.

The joints 37, 38 are formed at inner peripheral surfaces thereof with the thread holes 39, 40, into which tiny screws 41, 42 are screwed from outside the lower frames 3, 4, so that the end parts of the lower frames 3, 4 are attached to the joints 37, 38.

In this case, the connection elements 23, 24 are integrally formed with the joints 37,38. It is also acceptable that they are separately formed.

In those Figs., reference numerals 43, 44 denote elongated holes formed in the length direction of the joints 37, 38. Connection bolts 45,46 are inserted into the elongated holes 43, 44, and then, screwed into nuts (not shown) embedded in the top plate 2. so that the joints 37, 38 can be connected to the top plate 2.

The leg coupling for a table, etc., which is made in the manner as described hereinbefore, comprises the coupling body 7, a upper coupling 11 which is integral with the coupling body 7, the lower coupling 10, the leg 5 and the bolt 5, and further comprises the pair of connection elements 23, 24 and joints 37, 38 which are required for connection to the coupling body 7.

The coupling body 7 is integrally formed in a generally L-shape by aluminum diecasting, an upper part thereof is formed in a rectangular tubular shape, an upper end thereof is formed in a flat surface 7a so that the top plate 2 can stably be placed thereon, and a lower side thereof is formed with the upper coupling 11.

The upper coupling 11 is formed in an obliquely cut columnar shape, and the lower end thereof is formed on a tapered surface 15 of the obliquely cut part with a tapered convex part 16. The convex part 16 is formed with an oval-shaped bolt insertion hole 17. The upper part of the bolt insertion hole 17 is open in a stepped hole 18 formed on the end part of the coupling body 7.

Further, a rectangular engagement hole 22 is open in the end part of the rectangular tubular part of the coupling body 7. The inside of the engagement hole 22 is an empty space having a square frustum shape, an inner surface thereof is divided by upper and lower planes 22a, 22b, left and right planes 22c, 22d, and a pair of connection elements 23, 24 are engageably formed therein, and a thread hole 28 is formed at an inner part thereof.

The lower coupling 10 is formed in an obliquely cut columnar shape by aluminum diecasting, and an outer diameter thereof is formed in such a manner as to have the same diameter as that of the upper coupling 11. The lower coupling 10 is formed at an upper end thereof with a taper surface 13 facing upward. The taper surface 13 is formed at the center with a tapered concave groove 14 engageable with the convex part 16c and slidable. The concave groove 14 is formed at the center with a penetrating thread hole 12.

The leg 5 is made of solid wood. In this embodiment, it is made of a wooden member having the same outer diameter, and a bottomed coupling insertion hole 8 is formed at an upper part of the inner side thereof by drilling, so that the lower coupling 10 and upper coupling 11 can be inserted into the coupling insertion hole 8. Moreover, the leg 8 is formed at an sideward part of its upper end a notch groove 9, so that a basal part of the rectangular tubular part of the coupling body can be engaged therewith.

It is also accepted that the leg 5 is made of other material than wood, such as, for example, aluminum diecast and synthetic resin. Likewise, the outer shape of the leg 5 may be formed in a circular columnar shape, triangular columnar shape, rectangular columnar shape, oval columnar shape, or tapered columnar shape thereof as shown, for example, in FIG. 21(*a*) through (*e*).

Of them, FIG. 21(*a*) shows a leg having a tapered circular column shape in which the outer diameter is gradually reduced downward, and the leg is diagonally arranged with a lower end thereof displaced outward, FIG. 21(*b*) shows a leg having an oval columnar shape and vertically arranged with the coupling insertion hole 8 disposed outside the leg 5, so that the attaching space for the leg 5 with respect to the top plate 2 can be downsized and uniformed, FIG. 21(*c*) shows a leg which is formed in a tapered oval columnar shape, a lower end of the leg 5 is displaced outward and diagonally arranged, with the coupling insertion hole 8 arranged outside the leg 5, so that the attaching space for the leg 5 with respect to the top plate 2 can be downsized and uniformed, Likewise, FIG. 21(*d*) shows a leg 5 formed in a rectangular columnar shape and arranged vertically, with a coupling insertion hole 8 arranged at the center of the leg 5, a notch groove 9 thereof being formed on the diagonal line, and FIG. 21(*e*) shows a leg 5 formed in a tapered triangular shape, in which a lower end thereof is moved outward and arranged diagonally, the coupling insertion hole 8 is arranged at the center of the leg 5, and the notch groove 9 is open in an inner corner part.

The bolt 19 may be selected from those commercially available and is provided at a head part thereof with an engagement hole 21 engageable with a wrench.

The connection elements 23, 24 are formed in a wedge-shaped plate by aluminum diecasting, a side surface thereof is formed in an isosceles trapezoid shape, the other end thereof is integrally formed with generally prismatic joints 37, 38, and the joints 37, 38 and connection elements 23, 24 are formed in a generally dogleg shape.

It is also accepted that the connection elements 23, 24 and joints 37, 38 are separately formed. In doing so, they can be formed easily.

As mentioned above, since the component members of the leg coupling for a table, etc. have a relatively simple structure, they can be manufactured easily and inexpensively.

Next, when the leg 5 is attached to the lower surface of the top plate 2 using the component members, the upper coupling 11 and lower coupling 10 are inserted into the coupling insertion hole 8 of the leg 5 such that the couplers 11, 10 are in a vertical relation, and their taper surfaces 13, 16 are arranged in an opposing relation, and the convex part 16 is brought into engagement with the concave groove 14.

While keeping such an engagement relation, the bolt 19 is inserted into the bolt insertion hole 17 of the upper coupling 11 from the stepped hole 18 side, the thread shaft is screwed into the thread hole 12 of the lower coupling 10 so that the upper coupling 11 and lower coupling 10 are connected to each other.

When the taper surface 13, 16 of the lower coupling 10 and upper coupling 11 are fitted to each other, the bolt 19 is positioned at the center within the coupling insertion hole 8, and their outer peripheral surfaces are coaxially positioned. This status is as shown in FIGS. 17 (*a*) and (*c*).

When the bolt 19 is tightened by a wrench, the thread shaft is threadedly engaged with the thread hole 12 of the lower coupling 10 and progressed within the thread hole 12, so that the lower coupling 10 is pulled upward.

As a result, the taper surface 13 is slid on the taper surface 16, the concave groove 14 is moved upward along the convex part 16, the lower coupling 10 is moved upward, so that the upper end side of the taper surface 13 is slightly projected outward from the upper end of the taper surface 16 of the upper coupling 11 and the outer peripheral surface on the projecting side is press-fitted to the inner peripheral surface of the coupling insertion hole 8. This status is as shown in FIGS. 17(*a*) and (*d*).

In accordance with the upward movement of the lower coupling 10, the bolt 19 screwed to the lower coupling 10 is moved through the bolt insertion hole 17 in the same direction together with the lower coupling 10 and press-fitted to the inner peripheral surface of the bolt insertion hole 17.

As a result, the bolt 19 is caused to retain the lower coupling 10 by the press-fitting force, thus enabling to retain the leg 5 firmly by retaining the fitting state of the lower coupling 10.

Thereafter, the pair of connection elements 23,24 is inserted into the engagement hole 22 of the coupling body 7 so as to fit the fitting surfaces 23a, 23b of the connection elements 23, 24 and to connect the opposing convex guide 29 and guide groove 30, the bolt 27 is inserted into those concave grooves 25, 26 and the thread shaft is screwed into the thread hole 28 so as to fix the connection elements 23, 24 to the coupling body 7.

At that time, the connection elements 23, 24 are caused to taper surfaces 22a through 22d in the engagement hole 22, and the connection elements 23, 24 are connected to the coupling body 7 by the wedge effect firmly.

Thereafter, one ends of the lower frames 3, 4 are attached to the joints 37, 38 which are integral with the connection elements 23, 24, and the other ends are attached with the other side joints 37, 38, the coupling body 7 is connected to the upper parts of the four legs 5, the respective coupling bodies 7 are connected with the connection elements 23, 24, and the lower frames 3, 4 are attached to the connection elements 23, 24.

Thus, after the respective supporting frames located at the lower parts of the top plate 2, the connection bolts 45, 46 are inserted into the elongated holes 43, 44 of the joints 37, 38, and the thread shaft is screwed into a nut (not shown) embedded in the table 1, so that the joints 37, 38 are attached with the top plate 2. At that time, since the upper end face of the coupling body 7 is formed on the flat surface 7a, the top plate 2 can be attached stably.

INDUSTRIAL APPLICABILITY

As described hereinbefore, a leg coupling for a table, etc. according to the present invention is simple in structure and can be made easily and inexpensively, and it can attach a table leg having a wide variety of shapes and/or sectional shapes easily and firmly. Therefore, the leg coupling according to the present invention is suitable for attaching a table leg made of solid wood, for example.

DESCRIPTION OF REFERENCE NUMERALS

2 . . . top plate
3, 4 . . . lower frame
7 . . . coupling body
8 . . . coupling insertion hole
10 . . . lower coupling
11 . . . upper coupling
12 . . . thread hole
17 . . . bolt insertion hole
19 . . . bolt
13, 15 . . . taper surface
14 . . . concave groove
16 . . . convex part
22 . . . engagement hole
23, 24 . . . connection element
37, 38 . . . joint

The invention claimed is:

1. A leg coupling for furniture, the leg coupling comprising:
a coupling body for supporting a lower surface of a top plate of the furniture,
wherein:
the coupling body is configured to be arranged on an end side of the lower surface of the top plate;
a first end of the coupling body is provided with an upper coupling having a circular columnar shape and projecting downward;
an upper end part of a leg is configured to be arranged at the end side of the lower surface of the top plate;
the upper end part of the leg is formed with a coupling insertion hole;
the upper coupling is configured to be inserted into the coupling insertion hole;
a lower coupling having a circular columnar shape is arranged under the upper coupling;
fitting surfaces of the lower coupling are formed with taper surfaces;
the upper coupling is formed with a bolt insertion hole into which a bolt can be inserted;
the lower coupling is formed with a thread hole into which the bolt can be screwed;
the upper coupling and the lower coupling can be connected to each other through the bolt;
a second end of the coupling body is formed with a square frustum shaped engagement hole;
a pair of wedge-shaped engagement elements is arranged in the square frustum shaped engagement hole in an opposing relation so that the pair of wedge-shaped engagement elements can be press-fitted to each other;
each of the pair of wedge-shaped engagement elements is formed in a plate shape so that the pair of wedge-shaped engagement elements can be fitted to each other;
a first of the pair of wedge-shaped engagement elements has a joint surface with a convex guide and a second of the pair of wedge-shaped engagement elements has a joint surface with a guide groove; and
the convex guide is configured to be fitted into the guide groove so as to removably attach the pair of wedge-shaped engagement elements to each other.

2. The leg coupling according to claim 1, wherein:
the convex guide is a first convex guide and the guide groove is a second guide groove;
the first of the pair of wedge-shaped engagement elements is formed with the first convex guide and a first guide groove spaced apart;
the second of the pair of wedge-shaped engagement elements is formed with a second convex guide and the second guide groove spaced apart; and
the second guide groove and the second convex guide are removably arranged at the first convex guide and the first guide groove, respectively.

3. The leg coupling according to claim 1, wherein the pair of wedge-shaped engagement elements and a plurality of joints disposed outside the pair of wedge-shaped engagement elements are arranged in a V-shape in a plan view.

4. The leg coupling according to claim 3, wherein:
the convex guide is a first convex guide and the second of the pair of wedge-shaped engagement elements is formed with a second convex guide;
the first of the pair of wedge-shaped engagement elements, the first convex guide and a first of the plurality of joints are integrally formed; and
a second of the pair of wedge-shaped engagement elements, the second convex guide and a second of the plurality of joints are integrally formed.

5. The leg coupling according to claim 2, wherein:
a first notch groove is formed between the first convex guide and the first guide groove;
a second notch groove is formed between the second convex guide and the second guide groove; and
the first notch groove and the second notch groove can be in communication with each other when the first of the pair of wedge-shaped engagement elements and the second of the pair of wedge-shaped engagement elements are connected.

6. The leg coupling according to claim 3, wherein:
    each of the plurality of joints is formed in a prismatic shape so as to be insertable into a lower frame;
    each of the plurality of joints has screw holes formed at a right side surface and a left side surface thereof, so that screws can be inserted therein, respectively; and
    each of the plurality of joints has an elongated hole formed at an upper surface and a lower surface thereof, so that a connection bolt, which can be screwed into an embedded nut of the top plate, can be inserted therein.

7. The leg coupling according to claim 5, wherein, for each of the pair of wedge-shaped engagement elements:
    a polygonal joint element is disposed at a position orthogonal to the joint surface;
    a lower surface of the polygonal joint element is flat; and
    the polygonal joint element is arranged on a lower side, wherein the polygonal joint element of the first of the pair of wedge-shaped engagement elements and the polygonal joint element of the second of the pair of wedge-shaped engagement elements are engageable such that the first notch groove and the second notch groove are blocked.

8. The leg coupling according to claim 1, wherein the upper end part of the leg is formed with a notch groove so that the first end of the coupling body can be engaged therewith, the notch groove is open sideward and an end part of the notch groove is formed so as to be able to communicate with the coupling insertion hole.

9. The leg coupling according to claim 7, wherein each of the polygonal joint elements is provided at one end thereof with a convex part, and an assembling margin is formed between the convex part and the square frustum shaped engagement hole.

10. The leg coupling according to claim 1, wherein the leg is a single piece of wood and can have a variety of different shapes in section.

\* \* \* \* \*